(12) United States Patent
Saenger

(10) Patent No.: US 7,725,265 B2
(45) Date of Patent: May 25, 2010

(54) VH SIGNAL INTEGRATION MEASURE FOR SEISMIC DATA

(75) Inventor: Erik Hans Saenger, Zürich (CH)

(73) Assignee: Spectraseis AG, Zurich (CH)

( * ) Notice: Subject to any disclaimer, the term of this patent is extended or adjusted under 35 U.S.C. 154(b) by 0 days.

(21) Appl. No.: 12/414,670

(22) Filed: Mar. 31, 2009

(65) Prior Publication Data

US 2009/0187347 A1 Jul. 23, 2009

Related U.S. Application Data

(63) Continuation of application No. 11/772,344, filed on Jul. 2, 2007, now Pat. No. 7,539,578.

(60) Provisional application No. 60/806,455, filed on Jun. 30, 2006, provisional application No. 60/938,497, filed on May 17, 2007.

(51) Int. Cl.
*G01V 1/30* (2006.01)

(52) U.S. Cl. .............................. 702/14; 702/16; 367/9; 367/47

(58) Field of Classification Search ............. 702/14–18, 702/75–77; 367/72–73, 7–9, 47, 49
See application file for complete search history.

(56) References Cited

U.S. PATENT DOCUMENTS 5,671,136 A * 9/1997 Willhoit, Jr. .................. 702/18
2008/0002523 A1 * 1/2008 Podladchikov et al. ........ 367/49

* cited by examiner

*Primary Examiner*—Drew A Dunn
*Assistant Examiner*—Hien X Vo

(57) ABSTRACT

A method and system of processing seismic data includes acquiring three-component seismic data and combining horizontal components of the three-component seismic data to obtain a merged horizontal component. Frequency spectra are determined for the acquired three-component seismic data. A ratio of a vertical component of the seismic data to the merged horizontal component is determined. A V/H integration-measure is obtained from the integration of the area bounded by a selected minimum-amplitude value and the amplitude values greater than the selected minimum-amplitude value and the V/H integration-measure is stored in a form for display.

20 Claims, 10 Drawing Sheets

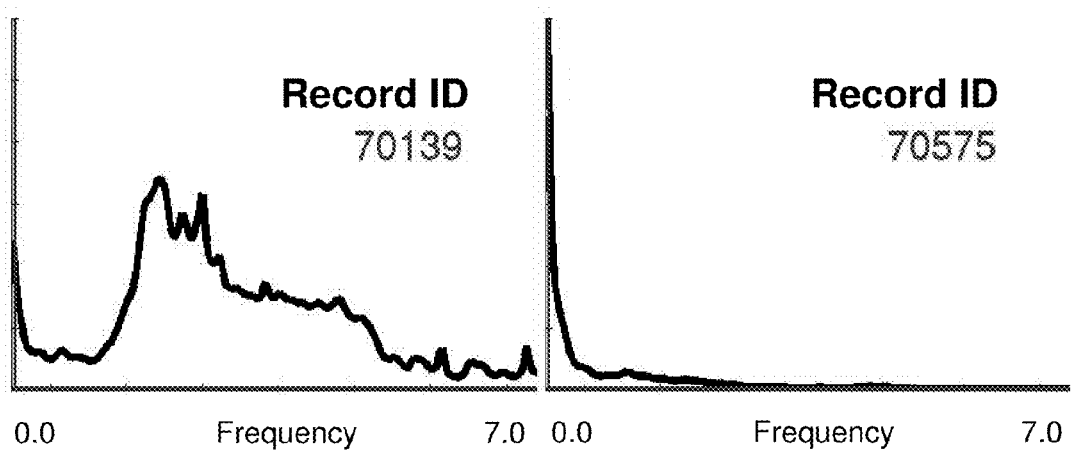
*Fig. 1A*          *Fig. 1B*
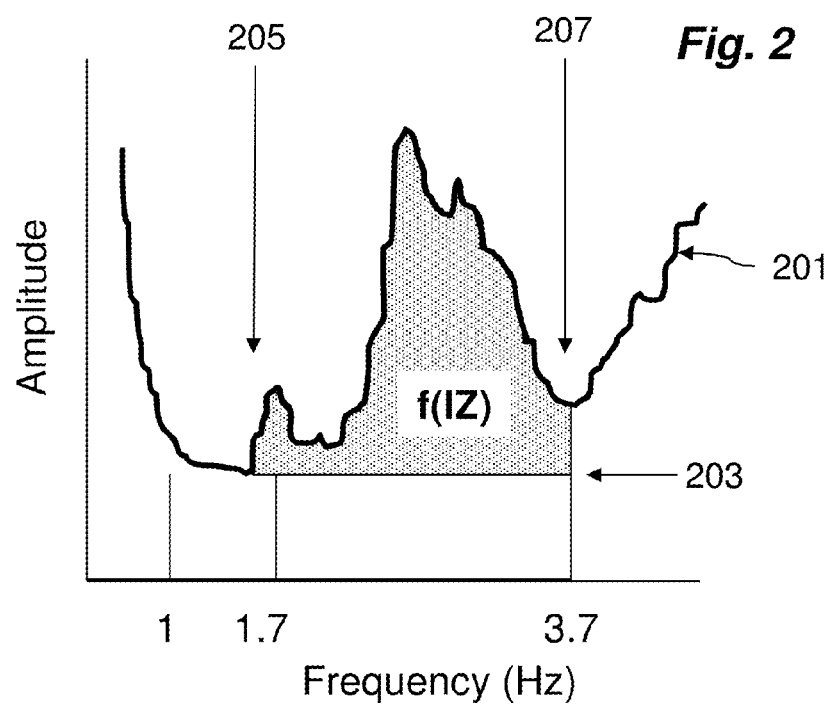
*Fig. 2*

VH SIGNAL INTEGRATION MEASURE FOR SEISMIC DATA

CROSS-REFERENCE TO RELATED APPLICATIONS

This application is a continuation of U.S. Utility application Ser. No. 11/772,344 filed 2 Jul. 2007, now U.S. Pat. No. 7,539,578, which application claims the benefit of expired U.S. Provisional Application No. 60/806,455 filed 30 Jun. 2006 and expired U.S. Provisional Application No. 60/938,497 filed 17 May 2007.

BACKGROUND OF THE DISCLOSURE

The disclosure is related to seismic exploration for oil and gas, and more particularly to determination of the positions of subsurface reservoirs.

Expensive geophysical and geological exploration investment for hydrocarbons is often focused in the most promising areas using relatively slow methods, such as reflection seismic data acquisition and processing. The acquired data are used for mapping potential hydrocarbon-bearing areas within a survey area to optimize exploratory well locations and to minimize costly non-productive wells.

The time from mineral discovery to production may be shortened if the total time required to evaluate and explore a survey area can be reduced by applying selected methods alone or in combination with other geophysical methods. Some methods may be used as a standalone decision tool for oil and gas development decisions when no other data is available.

Geophysical and geological methods are used to maximize production after reservoir discovery as well. Reservoirs are analyzed using time lapse surveys (i.e. repeat applications of geophysical methods over time) to understand reservoir changes during production. The process of exploring for and exploiting subsurface hydrocarbon reservoirs is often costly and inefficient because operators have imperfect information from geophysical and geological characteristics about reservoir locations. Furthermore, a reservoir's characteristics may change as it is produced.

The impact of oil exploration methods on the environment may be reduced by using low-impact methods and/or by narrowing the scope of methods requiring an active source, including reflection seismic and electromagnetic surveying methods. Various geophysical data acquisition methods have a relatively low impact on field survey areas. Low-impact methods include gravity and magnetic surveys that maybe used to enrich or corroborate structural images and/or integrate with other geophysical data, such as reflection seismic data, to delineate hydrocarbon-bearing zones within promising formations and clarify ambiguities in lower quality data, e.g. where geological or near-surface conditions reduce the effectiveness of reflection seismic methods.

SUMMARY

A method and system of processing seismic data includes acquiring three-component seismic data and combining horizontal components of the three-component seismic data to obtain a merged horizontal component. Frequency spectra are determined for the acquired three-component seismic data. A ratio of a vertical component of the seismic data to the merged horizontal component is determined. A V/H integration-measure is obtained from the integration of the area bounded by a selected minimum-amplitude value and the amplitude values greater than the selected minimum-amplitude value and the V/H integration-measure is stored in a form for display.

BRIEF DESCRIPTION OF THE DRAWINGS

FIG. 1A and FIG. 1B illustrate two spectra for the vertical component including spectra of the passive seismic wavefield (vertical surface velocities) in the frequency range from 0.5 to 7.4 Hz;

FIG. 2 illustrates an integration of frequency amplitude data above a minimum amplitude level as is used for determining an IZ value;

DETAILED DESCRIPTION

Figure 3:
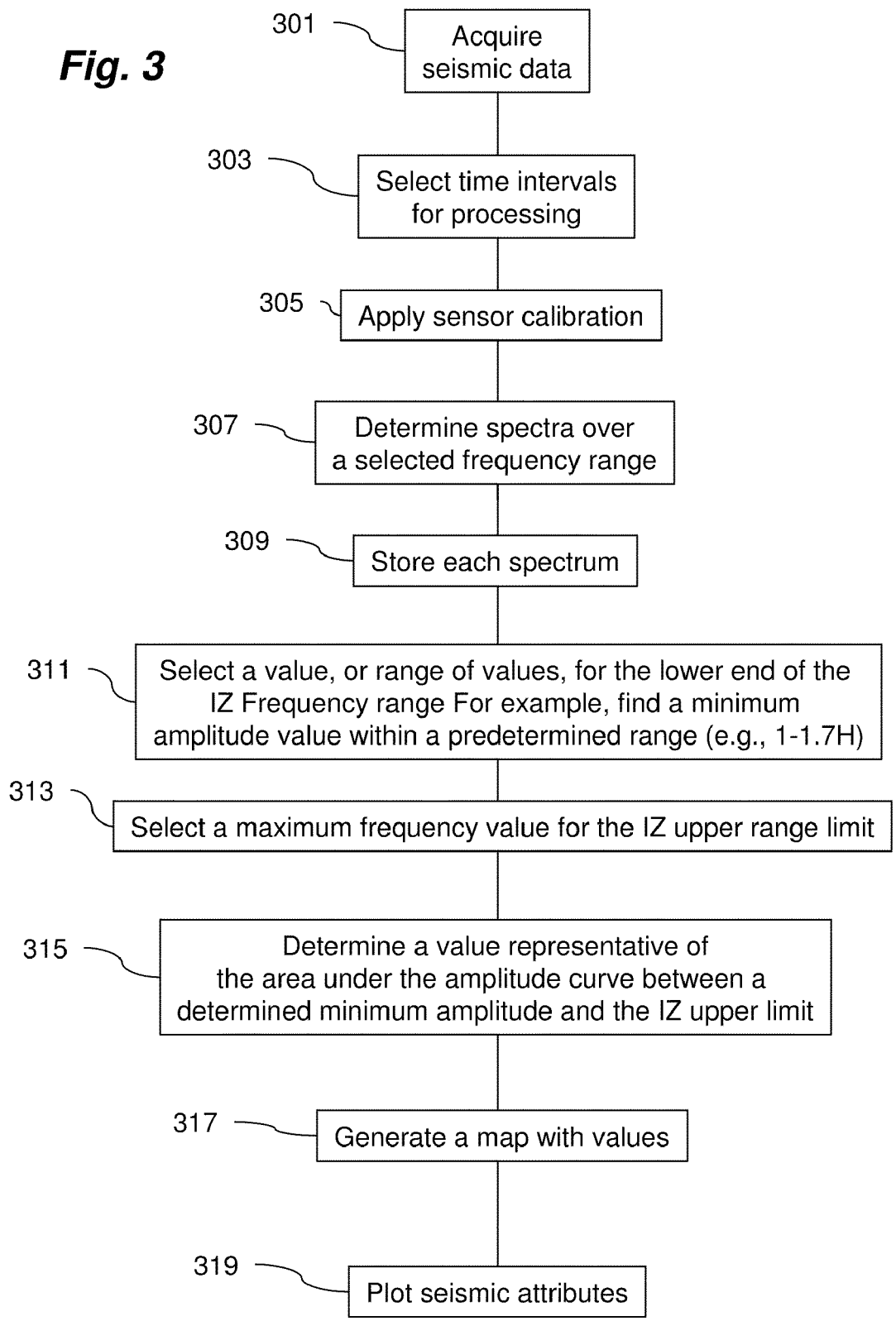
FIG. 3 is a flow chart of data processing for application of one or more embodiments to seismic data.

Information to determine the location of hydrocarbon reservoirs may be extracted from naturally occurring seismic waves and vibrations measured at the earth's surface using passive seismic data acquisition methods. A methodology for determining seismic attributes associated with reservoirs and for locating positions of subsurface reservoirs may be based on covariance algorithms of continuous time series measurements of three-component seismic data. Seismic wave energy emanating from subsurface reservoirs, or otherwise altered by subsurface reservoirs, is detected by three-component sensors and the polarity characteristics and associated seismic attributes of these data enable determining the location of the source of the energy.

So called "passive" seismic data acquisition methods rely on seismic energy from sources not directly associated with the data acquisition. In passive seismic monitoring there may be no actively controlled and triggered source. Examples of sources recorded that may be recorded with passive seismic acquisition are microseisms (e.g., rhythmically and persistently recurring low-energy earth tremors), microtremors and other ambient or localized seismic energy sources.

Narrow-band, low-frequency microtremor signals have been observed worldwide over hydrocarbon reservoirs (oil, gas and water multiphase fluid systems in porous media). These low frequency "hydrocarbon microtremors" may possess remarkably similar spectral and signal structure characteristics, pointing to a common source mechanism, even though the environments for the source of the microtremors may be quite different.

Microtremors are attributed to the background energy normally present in the earth. Microtremor seismic waves may include sustained seismic signals within various frequency ranges. Microtremor signals, like all seismic waves, contain information affecting spectral signature characteristics due to the media or environment that the seismic waves traverse as well as the source of the seismic energy. These naturally occurring and often relatively low frequency background seismic waves (sometimes termed noise or hum) of the earth may be generated from a variety of sources, some of which may be unknown or indeterminate.

Characteristics of microtremor seismic waves in the "infrasonic" range may contain relevant information for direct detection of subsurface properties including the detection of fluid reservoirs. The term infrasonic may refer to sound waves below the frequencies of sound audible to humans, and nominally includes frequencies under 20 Hz.

Three-component sensors are used to measure vertical and horizontal components of motion due to background seismic waves at multiple locations within a survey area. The sensors measure orthogonal components of motion simultaneously.

Local acquisition conditions within a geophysical survey may affect acquired data results. Acquisition conditions impacting acquired signals may change over time and may be diurnal. Other acquisition conditions are related to the near sensor environment. These conditions may be accounted for during data reduction.

The sensor equipment for measuring seismic waves may be any type of seismometer for measuring particle displacements or derivatives of displacements. Seismometer equipment having a large dynamic range and enhanced sensitivity compared with other transducers, particularly in low frequency ranges, may provide optimum results (e.g., multicomponent earthquake seismometers or equipment with similar capabilities). A number of commercially available sensors utilizing different technologies may be used, e.g. a balanced force feed-back instrument or an electrochemical sensor. An instrument with high sensitivity at very low frequencies and good coupling with the earth enhances the efficacy of the method.

Noise conditions representative of seismic waves that may have not traversed subsurface reservoirs can negatively affect the recorded data. Techniques for removing unwanted noise and artifacts and artificial signals from the data, such as cultural and industrial noise, are important where ambient noise is relatively high compared with desired signal energy.

The frequency ranges of hydrocarbon related microtremors for various areas have been reported between ~1 Hz to 10 Hz or greater. A direct and efficient detection of hydrocarbon reservoirs is of central interest for the development of new and existing oil or gas fields. One approach is to identify the direction reservoir associated energy may be emanating from by analyzing the polarity of three-component passive seismic data. If there is a steady source origin (or other alteration) of low-frequency seismic waves within a reservoir, the reservoir attributes and the location of the reservoir may be determined using covariance analysis.

Figure 7:
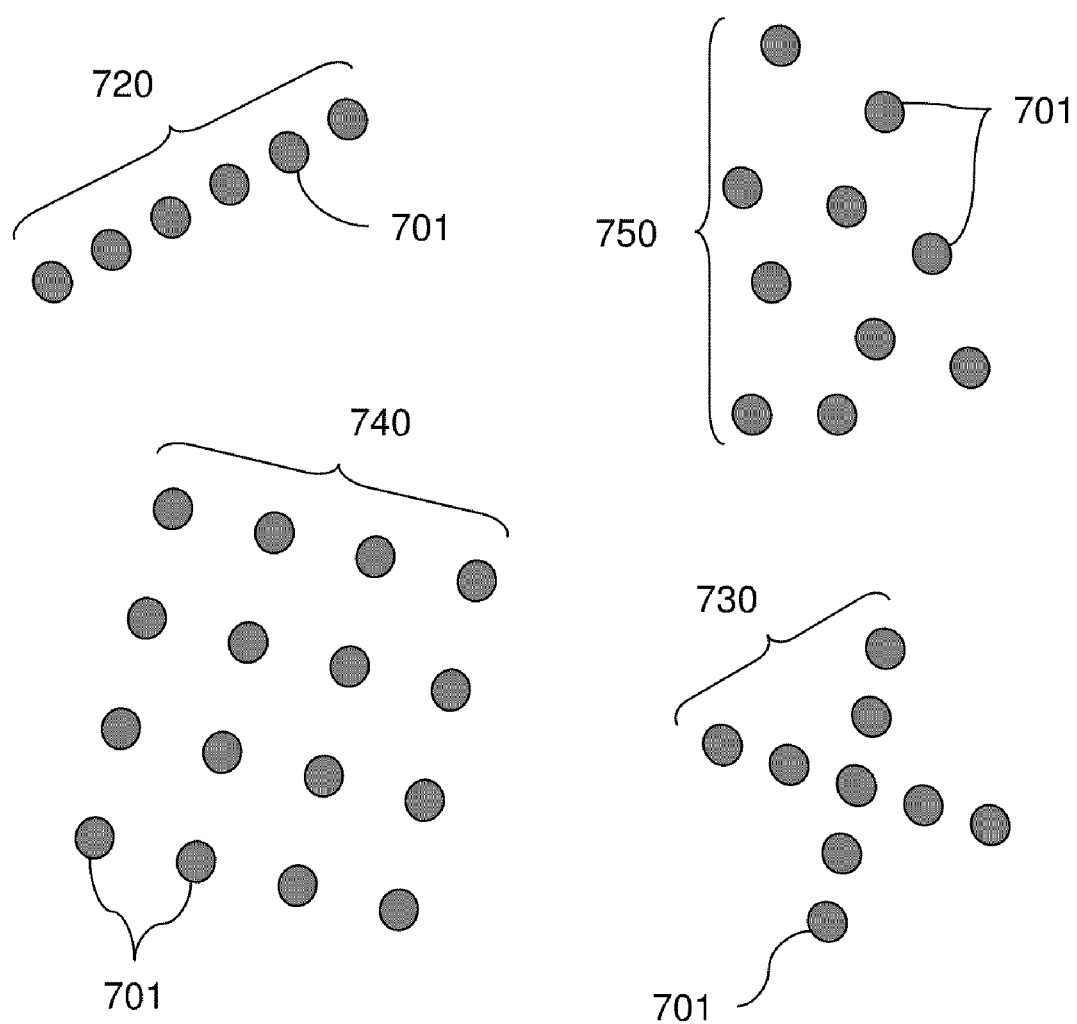
FIG. 7 illustrates various acquisition geometries which may be selected based on operational considerations.

A sensor grid layout may be used with preselected node spacing ranging (e.g. from 100 to 1000 m, but in any case, survey dependent). FIG. 7 illustrates some non-limiting embodiments of receiver station layouts. Several monitoring stations may be installed for the duration of the entire survey so that one or more sensors are more or less permanent for the whole survey or longer.

The raw data may include strong perturbations (noises, artefacts) and discontinuities (data gaps). In order to obtain a clean signal in the time domain, intervals with obvious strong artificial signals may be removed. The power spectral density (PSD) may be determined from the cleaned raw data. One procedure is to determine the PSD for preselected time intervals to calculate the arithmetic average of each PSD for the whole measurement time. This leads to a stable and reproducible result in the frequency domain.

FIG. 1A and FIG. 1B illustrate two spectra for the vertical component of the passive seismic wavefield (vertical surface velocities) in the frequency range from 0.5 to 7.4 Hz from two different sensor positions in a survey area. The spectra illustrated as Record ID 70139 in FIG. 1A was recorded over a known gas field, the spectra illustrated as Record ID 70575 in FIG. 1B is over an area with no expected hydrocarbon potential.

A method of processing potential hydrocarbon microtremor data is to map low-frequency energy anomalies in the expected total bandwidth of the hydrocarbon microtremor. This may be somewhere in a selected frequency range as illustrated in FIG. 2. As an example, the frequencies for hydrocarbon related tremors have been observed between 1 Hz and 10 Hz, though they may exist outside of this range as well. Analysis of the data may lead to a selection of a restricted frequency range (e.g., 1 Hz to 3.7 Hz) for analysis. An integration technique considers a vector measurement representative of the strength of the hydrocarbon signal, for example the vertical component of the signal. The noise variations present in the spectra may be taken into account by determining an individual frequency 205 associated with a PSD local amplitude minimum for each spectrum between 1 and 1.7 Hz. Many hydrocarbon microtremors are observed with a minimum in similar frequency ranges, though they will be survey or area dependent. The integral of frequency amplitude data above this minimum amplitude level is used for determining the "IZ" value (see FIG. 2; IZ stands for Integral of Z-component though in principal this method may be applied to any vector component or combination of vector components). The symbol f(IZ) represents a measure related to an integration of the area between the amplitude value 201 over the spectrum and the selected amplitude minimum 203 over the range from a minimum frequency value 205 to a maximum frequency value 207. For an example survey in an area with gas reservoirs the integral under the curve was calculated between 1 and 3.7 Hz because of some identified artificial noise sources above this frequency interval.

FIG. 3 illustrates a flow chart for a non-limiting embodiment for determining a representative value related to the strength of a hydrocarbon signal. At least one vector component of seismic data is acquired 301 which may be the vertical vector of 3D data. Time intervals are selected from the data for processing 303. These time intervals may be selected based on the presence or characteristics of noise or signal in the time series to be used for processing. Any necessary sensor calibration may be applied 305. For the selected time series, spectra over a selected frequency range is determined 307 and the spectra are stored 309. The spectra are then analyzed to determine a minimum frequency value, which may be within a preselected range 311. A maximum frequency value is selected for the upper IZ limit 313. A value representative over the range from the minimum value location to the maximum value location, for example the shaded area f(IZ) of FIG. 2, may be determined relative to the area under the amplitude curve 201 and above the amplitude minimum 203 between a selected frequency minimum 205 and a selected frequency maximum 207. The selected frequency minimum is illustrated as selected over a preselected range (1 to 1.7 Hz in this FIG. 2 example) but may be selected arbitrarily as well. The frequency maximum (upper range endpoint) for inclusion in the integration may also be selected at a position of a local frequency minimum or maximum over a range, or the maximum may be selected arbitrarily as illustrated in this example. Additionally for FIG. 3, the embodiment illustrated may include determining a value representative of the area under the amplitude curve between a determined minimum amplitude and the IZ upper limit 315. A map may be generated with the values 317 and the seismic attributes plotted 319.

A local frequency minimum suitable for demarking the lower range endpoint may be found by selecting the local minimum greater than the well known 'ocean wave peak(s) that are very often found in the 0.1 to 0.2 Hz area. The local minimum then often occurs in the vicinity of 1 to 2 Hz and will occur before a general or temporary increase in the frequency amplitudes for PSDs of the transformed seismic data. This local minimum may be described then as the local minimum at a frequency greater than the ocean wave peak frequency that may occur in the 0.8 to 2 Hz frequency range or prior to any significant increase in amplitude.

Figure 4:
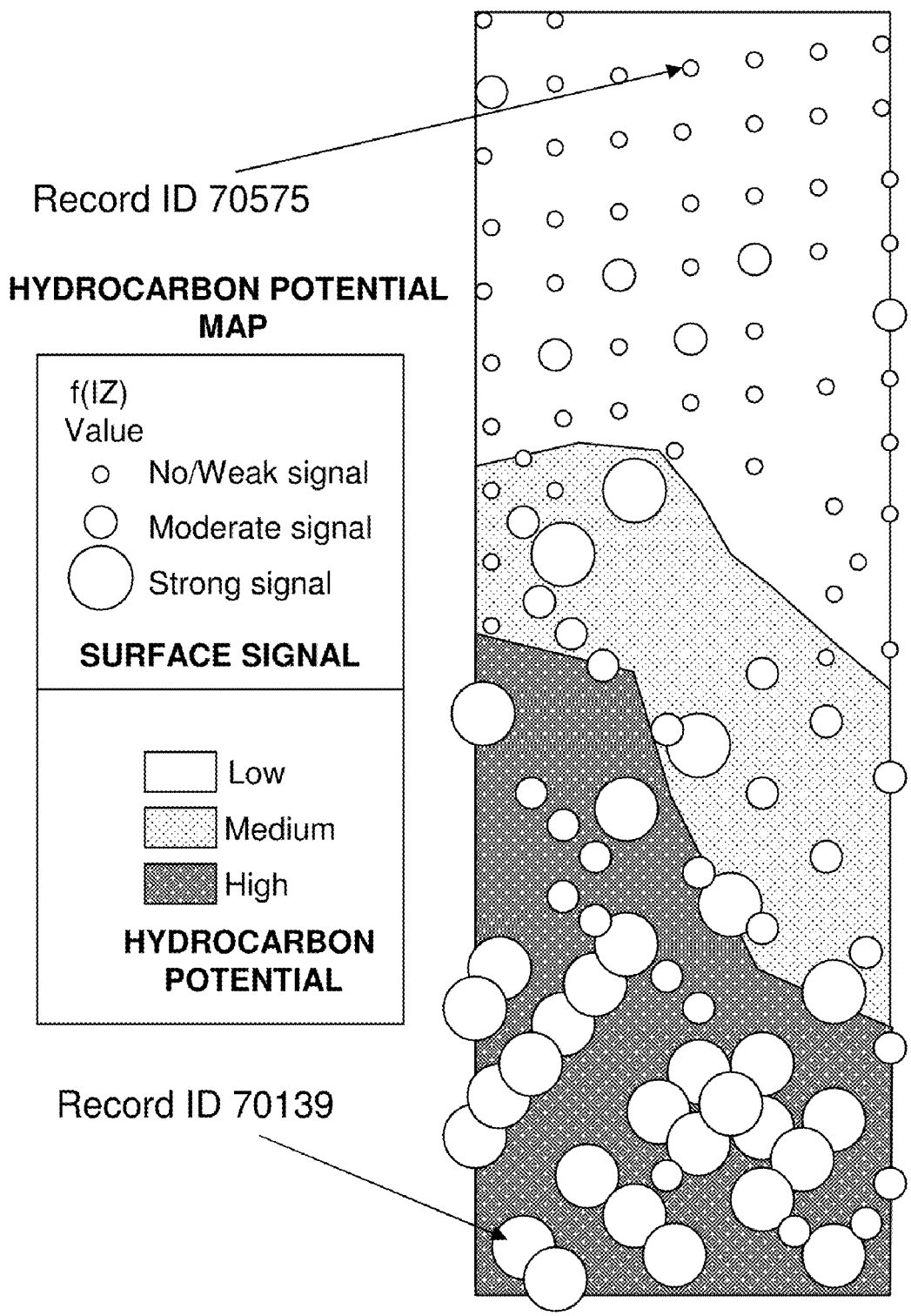
FIG. 4 is a hydrocarbon potential map as developed based on the relative strength of values derived from f(IZ) determinations.

A hydrocarbon potential map, FIG. 4, may be developed based on the relative strength of this values derived from f(IZ) determinations. The larger values or 'Strong signal' f(IZ) values have been found to be well aligned with areas where gas production is located.

Figure 5:
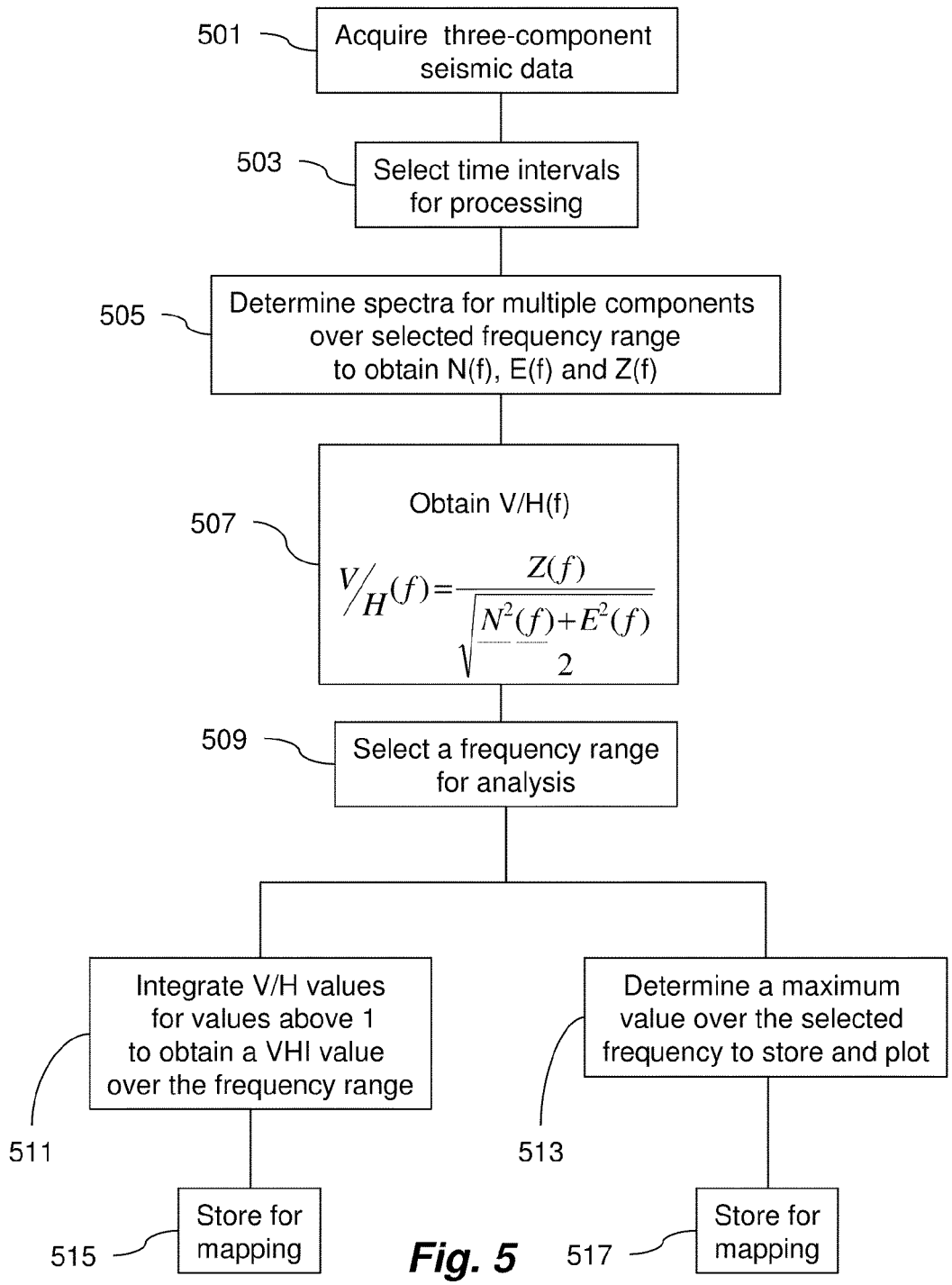
FIG. 5 illustrates a flow chart for a non-limiting embodiment for an alternative method for determining a representative value related to the strength of a hydrocarbon signal.

FIG. 5 illustrates a flow chart for a non-limiting embodiment for an alternative method for determining a representative value related to the strength of a hydrocarbon signal. Three vector components of seismic data are acquired 501. Time intervals are selected for processing 503. These time intervals may be selected based on the presence of noise or signal present in the time series to be used for processing. The spectra for each vector, like Z(f), N(f) and E(f) are determined 505. A V/H value is then calculated 507 by:

$$V/H(f) = \frac{Z(f)}{\sqrt{\frac{N^2(f) + E^2(f)}{2}}}.$$

Figure 6A:
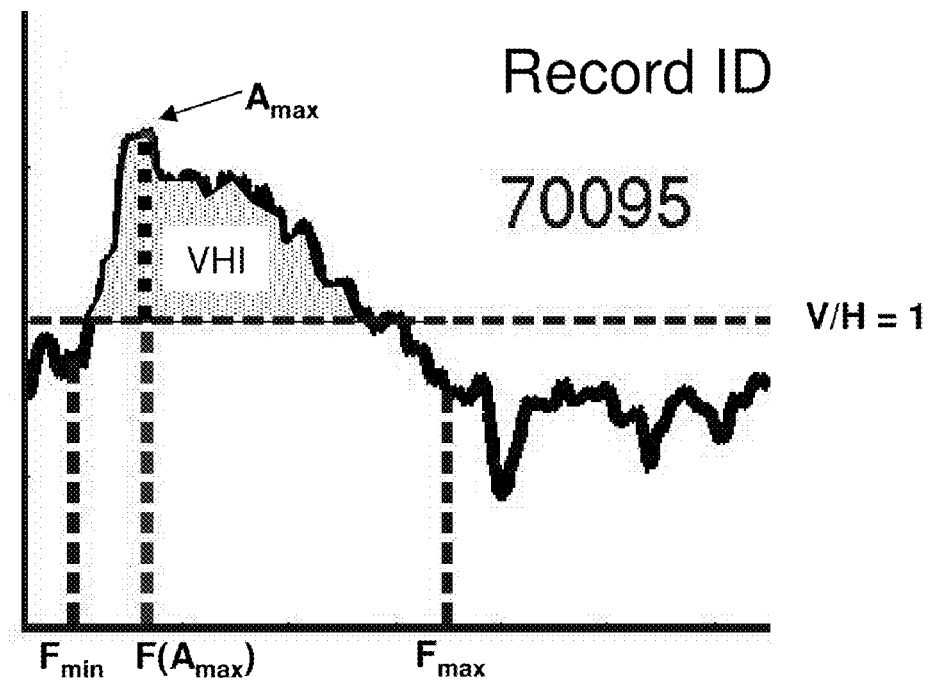
FIG. 6A and FIG. 6B illustrate integrations for V/H values greater than unity.
Figure 6B:
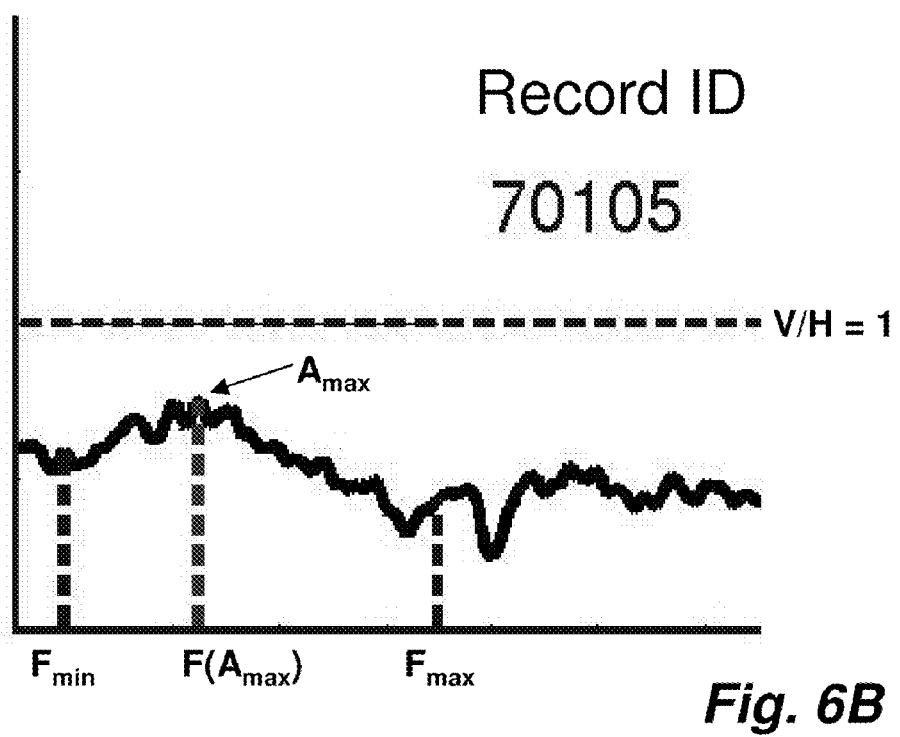

A frequency range for the V/H data is selected 509 for analysis. As illustrated in FIG. 6A and FIG. 6B, when this V/H value is greater than unity, it may be integrated between unity and the amplitude values to obtain a V/H integrated value (VHI) 511 over a selected frequency range (e.g., $F_{min}$ to $F_{max}$ in FIG. 6A and FIG. 6B). The VHI values may be stored 515 and plotted as a map as hydrocarbon indicators or a hydrocarbon potential map. Alternatively, a maximum amplitude value of the V/H values, $A_{max}$, or the difference between $A_{max}$ and 1, may be determined 513 for a record and then plotted directly referenced to the sensor position that recorded the data. These values may be used to form a hydrocarbon map of a survey in a similar manner to FIG. 4. The maximum amplitude V/H values, $A_{max}$, may be stored 517 and plotted as a map of the relative strength of possible hydrocarbon indicators. The values of the frequency at which $A_{max}$ occurs, $F(A_{max})$ as illustrated in FIG. 6B may also be stored and plotted.

Data may be acquired with arrays, which may be 2D or 3D, or even arbitrarily positioned sensors 701 as illustrated in FIG. 7. FIG. 7 illustrates various acquisition geometries which may be selected based on operational considerations. Array 720 is a 2D array and while illustrated with regularly spaced sensors 701, regular distribution is not a requirement. Array 730 and 740 are example illustrations of 3D arrays. Sensor distribution 750 could be considered and array of arbitrarily placed sensors and may even provide for some modification of possible spatial aliasing that can occur with regular spaced sensor 701 acquisition arrays. Use of arrays enables a beam type migration to locate and image source points.

Figure 8:
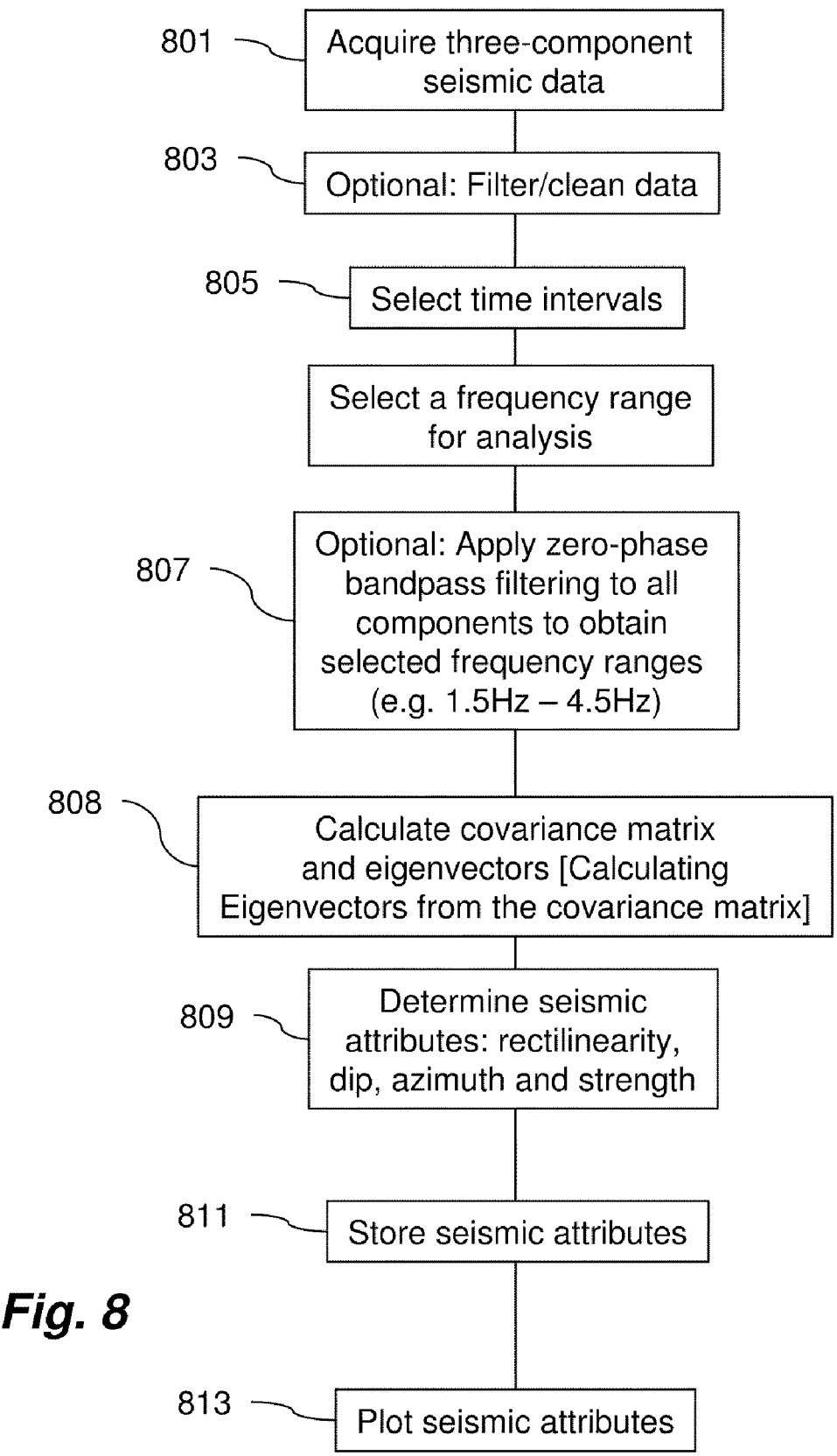
FIG. 8 illustrates a flow chart for a method according to a non-limiting embodiment of the present disclosure that includes using passively acquired seismic data to determine four independent seismic attributes for hydrocarbon tremor detection.

FIG. 8 illustrates a method according to a non-limiting embodiment of the present disclosure that includes using passively acquired seismic data to determine four independent seismic attributes for hydrocarbon tremor detection. The embodiment, which may include one or more of the following (in any order), includes acquiring three component passive seismic data 801. The acquired data from each sensor station may be time stamped and include multiple data vectors. An example is passive seismic data, such as three component data from "earthquake" type sensors. Each data vector is associated with an orthogonal direction of movement. The vector data may be arbitrarily mapped or assigned to any coordinate reference system, for example designated east, north and depth (e.g., respectively, Ve, Vn and Vz) or designated $V_x$, $V_y$ and $V_z$ according to any desired convention. The data vectors may all be the same length and/or synchronized.

While data may be acquired with multi-component earthquake seismometer equipment with large dynamic range and enhanced sensitivity, particularly for low frequencies, many different types of sensor instruments can be used with different underlying technologies and varying sensitivities. Sensor positioning during recording may vary, e.g. sensors may be positioned on the ground, below the surface or in a borehole. The sensor may be positioned on a tripod or rock-pad. Sensors may be enclosed in a protective housing for ocean bottom placement. Wherever sensors are positioned, good coupling results in better data. Recording time may vary, e.g. from minutes to hours or days. In general terms, longer-term measurements may be helpful in areas where there is high ambient noise and provide extended periods of data with fewer noise problems.

The layout of a data survey may be varied, e.g. measurement locations may be close together or spaced widely apart and different locations may be occupied for acquiring measurements consecutively or simultaneously. Simultaneous recording of a plurality of locations (a sensor array) may provide for relative consistency in environmental conditions that may be helpful in ameliorating problematic or localized ambient noise not related to subsurface characteristics of interest. Additionally the array may provide signal differentiation advantages due to commonalities and differences in the recorded signal.

The data may be optionally conditioned or cleaned as necessary 803 to account for unwanted noise or signal interference. For example, various processing methods may be employed such as offset removal, detrending the signal and a preliminary band pass or other targeted frequency filtering. The vector data may be divided into selected time windows 805 for processing. The length of time windows for analysis may be chosen to accommodate processing or operational concerns.

If a preferred or known range of frequencies for which a hydrocarbon microtremor signature is known or expected, an optional frequency filter (e.g., zero phase, Fourier of other wavelet type) may be applied 807 to condition the data for processing. Examples of basis functions for filtering or other processing operations include without limitation the classic Fourier transform or one of the many Continuous Wavelet Transforms (CWT) or Discreet Wavelet Transforms. Examples of other transforms include Haar transforms, Haademard transforms and Wavelet Transforms. The Morlet wavelet is an example of a wavelet transform that often may be beneficially applied to seismic data. Wavelet transforms have the attractive property that the corresponding expansion may be differentiable term by term when the seismic trace is smooth. Additionally, signal analysis, filtering, and suppressing unwanted signal artifacts may be carried out efficiently using transforms applied to the acquired data signals.

The three component data may be input to a covariance matrix 808 to determine eigenvectors and eigenvalues to extract polarization related parameters of the recorded microtremor data. For example, as a non-limiting example, a zero-phase filter may be applied which selects frequencies from 1 Hz to 3.7 Hz for further analysis. Other ranges may be selected on a case dependent basis (e.g., 1.5 Hz to 5.0 Hz). As a further example, the analysis of the polarization behavior may be performed for a plurality of preselected time intervals, such as consecutive 40 second time intervals over an arbitrary length of recording.

Considering any time interval of three-component data $u_x$, $u_y$ and $u_z$ containing N time samples auto-and cross-variances can be obtained with:

$$C_{ij} = \left[\frac{1}{N}\sum_{s=1}^{N} u_i(s)u_j(s)\right]$$

where i and j represent the component index x, y, z and s is the index variable for a time sample. The 3×3 covariance matrix:

$$C = \begin{matrix} C_{xx} & C_{xy} & C_{xz} \\ C_{xy} & C_{yy} & C_{yz} \\ C_{xz} & C_{yz} & C_{zz} \end{matrix}$$

is real and symmetric and represents a polarization ellipsoid with a best fit to the data. The principal axis of this ellipsoid can be obtained by solving C for its eigenvalues $\lambda_1 \geq \lambda_2 \geq \lambda_3$ and eigenvectors p1, p2, p3:

$$(C-\lambda I)p=0$$

where I is the identity matrix.

Inverting field-acquired passive seismic data to determine the location of subsurface reservoirs may include using the acquired time-series data as 'sources' which affect seismic parameters that may be determined using a covariance matrix analysis 809. At least four seismic parameters may be extracted from the continuous signal of passive three-component seismic data. The parameters include rectilinearity, dip, azimuth and strength of signal.

The seismic data parameter called rectilinearity L, which also may be called linearity, relates the magnitudes of the intermediate and smallest eigenvalue to the largest eigenvalue $$L = 1 - \left(\frac{\lambda_2 + \lambda_3}{2\lambda_1}\right),$$

and measures the degree of how linearly the incoming wavefield is polarized. This parameter yields values between zero and one. Two polarization parameters describe the orientation of the largest eigenvector $p_1=(p_1(x), p_1(y), p_1(z))$ in dip and azimuth. The dip can be calculated with $$\phi = \arctan\left(\frac{p_1(z)}{\sqrt{p_1^2(x)+p_1^2(y)}}\right)$$

and is zero for horizontal polarization and is defined positive in positive z-direction. The azimuth is specified as $$\theta = \arctan\left(\frac{p_1(y)}{p_1(x)}\right)$$

and measured positive counterclockwise (ccw) from the positive x-axis. In addition we analyse the strength of the signal which is given by the eigenvalue $\lambda_1$:

$$\lambda_1 = \sqrt{p_1^2(x)+p_1^2(y)+p_1^2(z)}.$$

Figure 9A:
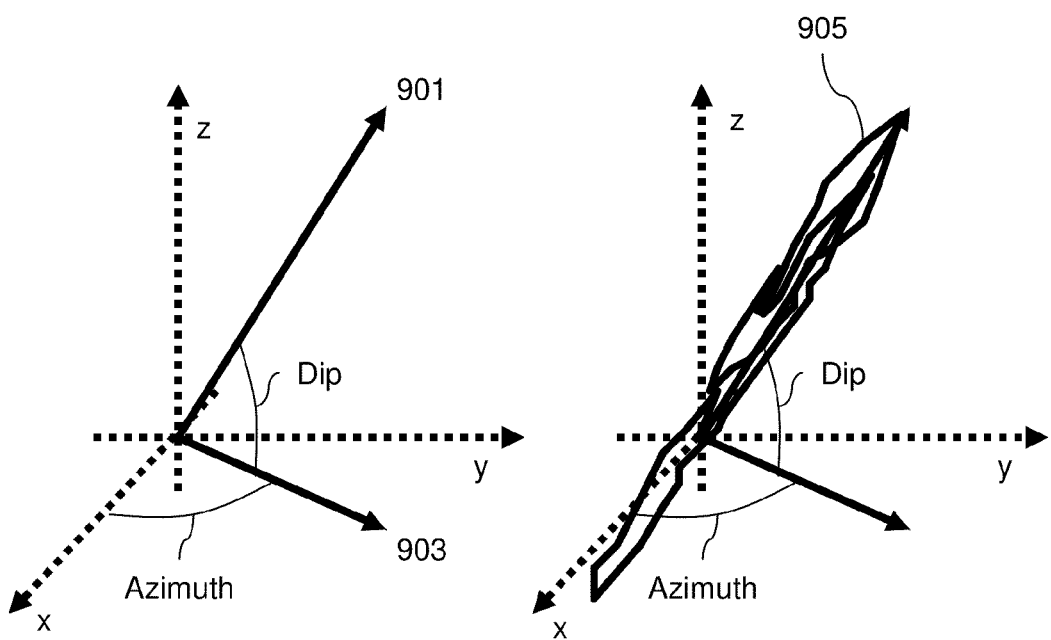
FIG. 9A illustrates seismic attribute parameter extractions from data acquired over a known hydrocarbon reservoir.
Figure 9B:
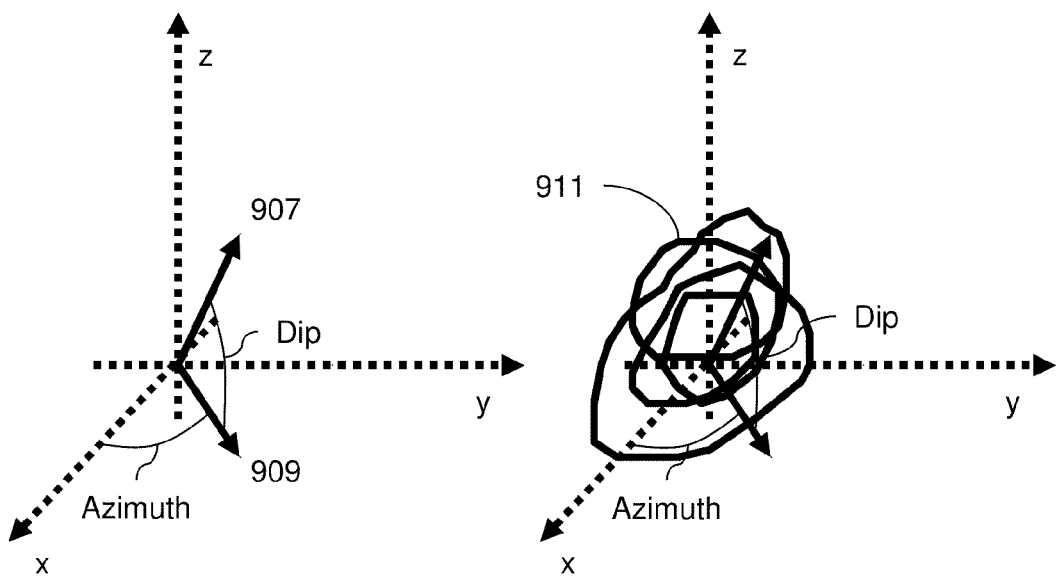
FIG. 9B illustrates seismic attribute parameter extractions from data acquired over an area where hydrocarbon potential is expected to be very low or non-existent.

A non-limiting example of a data display with representations of the four seismic parameters is illustrated in FIG. 9A wherein field data used for parameter extraction has been acquired over a known hydrocarbon reservoir. The field data in FIG. 9B used for seismic parameter extraction according to the present disclosure has been acquired over an area where hydrocarbon potential is expected to be very low or nonexistent. All four attributes are schematically illustrated in FIG. 9A and FIG. 9B, a polarization parameter sketch showing the dip and azimuth as marked. FIG. 9A illustrates a record that has high rectilinearity and medium dip, FIG. 9B shows low rectilinearity and relatively high dip. The length of the dip vector 901 in FIGS. 9A and 907 in FIG. 9B is given by their largest eigenvalues, $\lambda_1$, respectively, further referred as the strength of the signal. The azimuth is represented by graphically by vector 903 in FIGS. 9A and 909 in FIG. 9B. A qualitative view of the rectilinearity of the measurements is depicted by 905 of FIGS. 9A and 911 of FIG. 9B.

Figure 10A:
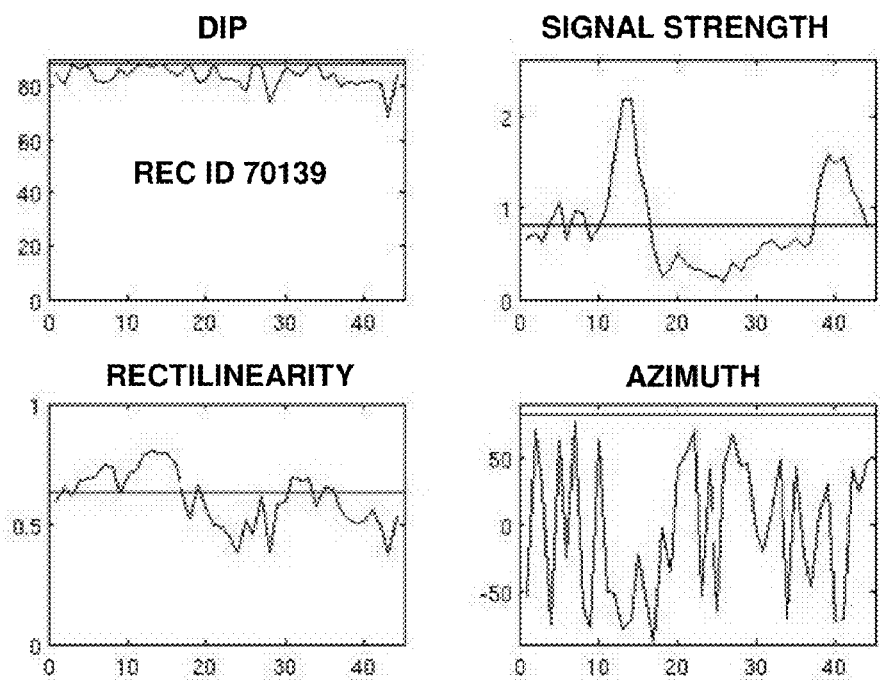
FIG. 10A illustrates seismic attributes from data acquired over a known hydrocarbon reservoir.
Figure 10B:
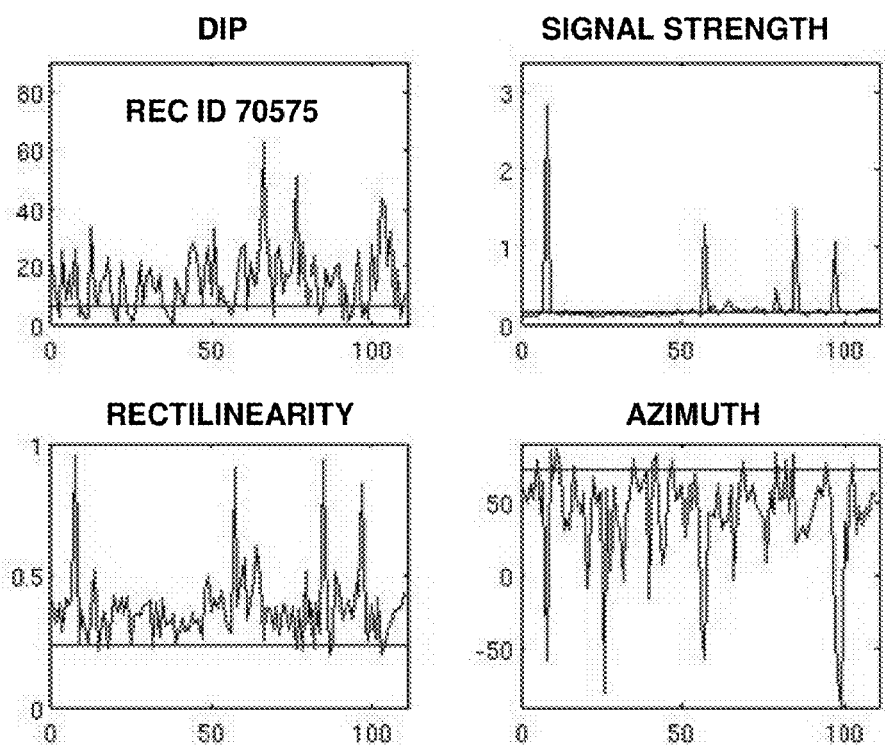
FIG. 10B illustrates seismic attributes from data acquired over an area where hydrocarbon potential is expected to be very low or non-existent.

The trends in the attributes dip, azimuth, rectilinearity and strength in a preselected frequency, that appears to be a hydrocarbon microtremor frequency range (i.e., 1-3.7 Hz), for the data records illustrated in FIG. 1A (Record ID 70139) and FIG. 1B (Record ID 70565) is illustrated with FIG. 10A and FIG. 10B.

In the reservoir area (Record ID 70139) the dip parameter has a stable and high value ($\geq 80°$) directly above the reservoir (FIG. 10A, top, left hand side). The signal strength parameter is varying but clearly present over the whole measured period. The rectilinearity is relatively high and relatively stable and appears to be correlated with the trend of the strength attribute. The azimuth parameter is strongly varying as is expected for such high dip parameters values.

For data from the recording station presumed to be outside of an area containing hydrocarbons (Record ID 70575) the dip parameter is fairly stable around low values ($\approx 20°$), as illustrated in FIG. 10B, top, left hand side. The strength parameter is relatively low with some spikes. The rectilinearity parameter is lower in comparison with the values observed above a hydrocarbon reservoir (such as illustrated in FIG. 10A). The azimuth parameter is relatively stable.

Figure 11:
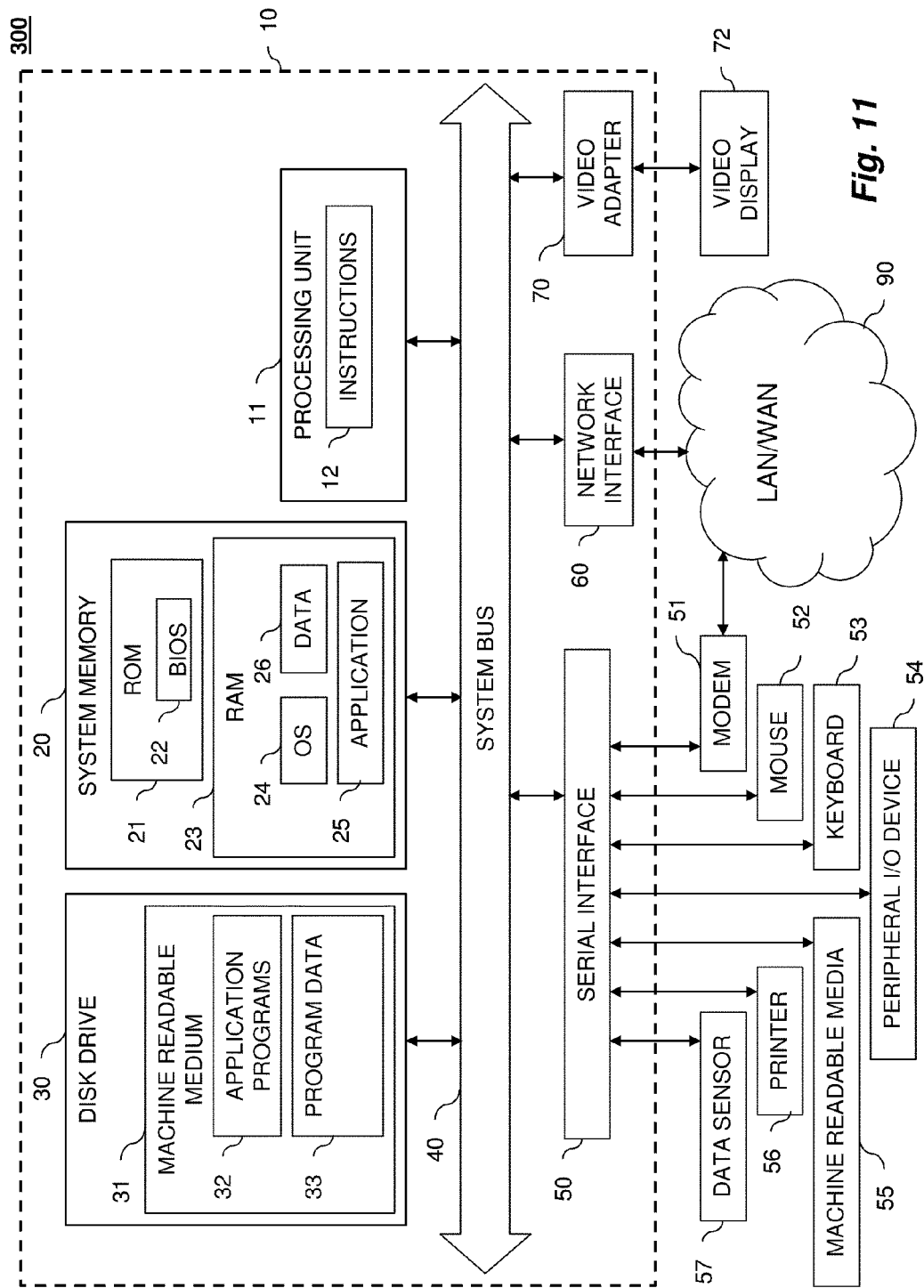
FIG. 11 is diagrammatic representation of a machine in the form of a computer system within which a set of instructions, when executed may cause the machine to perform any one or more of the methods and processes described herein.

FIG. 11 is illustrative of a computing system and operating environment for implementing a general purpose computing device in the form of a computer 10. Computer 10 includes a processing unit 11 that may include 'onboard' instructions 12. Computer 10 has a system memory 20 attached to a system bus 40 that operatively couples various system components including system memory 20 to processing unit 11. The system bus 40 may be any of several types of bus structures using any of a variety of bus architectures as are known in the art.

While one processing unit 11 is illustrated in FIG. 11, there may be a single central-processing unit (CPU) or a graphics processing unit (GPU), or both or a plurality of processing units. Computer 10 may be a standalone computer, a distributed computer, or any other type of computer.

System memory 20 includes read only memory (ROM) 21 with a basic input/output system (BIOS) 22 containing the basic routines that help to transfer information between elements within the computer 10, such as during start-up. System memory 20 of computer 10 further includes random access memory (RAM) 23 that may include an operating system (OS) 24, an application program 25 and data 26.

Computer 10 may include a disk drive 30 to enable reading from and writing to an associated computer or machine readable medium 31. Computer readable media 31 includes application programs 32 and program data 33.

For example, computer readable medium 31 may include programs to process seismic data, which may be stored as program data 33, according to the methods disclosed herein. The application program 32 associated with the computer readable medium 31 includes at least one application interface for receiving and/or processing program data 33. The program data 33 may include seismic data acquired according to embodiments disclosed herein. At least one application interface may be associated with calculating a ratio of data components, which may be spectral components, for locating subsurface hydrocarbon reservoirs.

The disk drive may be a hard disk drive for a hard drive (e.g., magnetic disk) or a drive for a magnetic disk drive for reading from or writing to a removable magnetic media, or an optical disk drive for reading from or writing to a removable optical disk such as a CD ROM, DVD or other optical media.

Disk drive 30, whether a hard disk drive, magnetic disk drive or optical disk drive is connected to the system bus 40 by a disk drive interface (not shown). The drive 30 and associated computer-readable media 31 enable nonvolatile storage and retrieval for application programs 32 and data 33 that include computer-readable instructions, data structures, program modules and other data for the computer 10. Any type of computer-readable media that can store data accessible by a computer, including but not limited to cassettes, flash memory, digital video disks in all formats, random access memories (RAMs), read only memories (ROMs), may be used in a computer 10 operating environment.

Data input and output devices may be connected to the processing unit 11 through a serial interface 50 that is coupled to the system bus. Serial interface 50 may a universal serial bus (USB). A user may enter commands or data into computer 10 through input devices connected to serial interface 50 such as a keyboard 53 and pointing device (mouse) 52. Other peripheral input/output devices 54 may include without limitation a microphone, joystick, game pad, satellite dish, scanner or fax, speakers, wireless transducer, etc. Other interfaces (not shown) that may be connected to bus 40 to enable input/output to computer 10 include a parallel port or a game port. Computers often include other peripheral input/output devices 54 that may be connected with serial interface 50 such as a machine readable media 55 (e.g., a memory stick), a printer 56 and a data sensor 57. A seismic sensor or seismometer for practicing embodiments disclosed herein is a nonlimiting example of data sensor 57. A video display 72 (e.g., a liquid crystal display (LCD), a flat panel, a solid state display, or a cathode ray tube (CRT)) or other type of output display device may also be connected to the system bus 40 via an interface, such as a video adapter 70. A map display created from spectral ratio values as disclosed herein may be displayed with video display 72.

A computer 10 may operate in a networked environment using logical connections to one or more remote computers. These logical connections are achieved by a communication device associated with computer 10. A remote computer may be another computer, a server, a router, a network computer, a workstation, a client, a peer device or other common network node, and typically includes many or all of the elements described relative to computer 10. The logical connections depicted in FIG. 11 include a local-area network (LAN) or a wide-area network (WAN) 90. However, the designation of such networking environments, whether LAN or WAN, is often arbitrary as the functionalities may be substantially similar. These networks are common in offices, enterprise-wide computer networks, intranets and the Internet.

When used in a networking environment, the computer 10 may be connected to a network 90 through a network interface or adapter 60. Alternatively computer 10 may include a modem 51 or any other type of communications device for establishing communications over the network 90, such as the Internet. Modem 51, which may be internal or external, may be connected to the system bus 40 via the serial interface 50.

In a networked deployment computer 10 may operate in the capacity of a server or a client user machine in server-client user network environment, or as a peer machine in a peer-to-peer (or distributed) network environment. In a networked environment, program modules associated with computer 10, or portions thereof, may be stored in a remote memory storage device. The network connections schematically illustrated are for example only and other communications devices for establishing a communications link between computers may be used.

In one embodiment a method and system of processing seismic data includes acquiring three-component seismic data and combining horizontal components of the three-component seismic data to obtain a merged horizontal component. Frequency spectra are determined for the acquired three-component seismic data. A ratio of a vertical component of the seismic data to the merged horizontal component is determined. A V/H integration-measure is obtained from the integration of the area bounded by a selected minimum-amplitude value and the amplitude values greater than the selected minimum-amplitude value and the V/H integration-measure is stored in a form for display.

In another aspect the selected minimum-amplitude value may be 1. The V/H integration-measure may be determined within a predetermined frequency range. The predetermined frequency range may be a range selected between 1 Hz and 8 Hz. The input seismic data may include separate time intervals. A band pass filter may be applied to the data. The V/H integration-measure may be displayed as a potential hydrocarbon indicator.

In another embodiment a set of application program interfaces is embodied on a computer readable medium for execution on a processor in conjunction with an application program for determining an VH integration-measure for displaying a hydrocarbon potential indicator determined from seismic data includes a first interface that receives data to determine a frequency spectrum for three component seismic data, a a second interface that receives a selected minimum amplitude value, a third interface that receives a ratio of a vertical component of the seismic data to the merged horizontal component to obtain a VH and a fourth interface that receives a VH integration-measure from the integration of the VH ratio for an area bounded by the selected minimum-amplitude value and the amplitude values greater than the selected minimum-amplitude value.

In another aspect the set of application interface programs may include a fifth interface that receives instruction data for applying a zero-phase frequency filter to the seismic data. A sixth interface may receive instruction data for determining the V/H integration measure within a predetermined frequency range. The predetermined frequency range may be in a range selected between 1 Hz and 10 Hz. The seismic data may include separate time intervals.

In another embodiment an information handling system for determining a hydrocarbon potential indicator from seismic data includes a processor configured to determine a frequency spectrum for three-component seismic data, a processor configured to combine horizontal components of three component seismic data to obtain a merged horizontal component, a processor configured to determine a hydrocarbon potential indicator from the integration of an area bounded by a selected minimum-amplitude value and the amplitude values between a ratio of a vertical component of the seismic data to the merged horizontal component and a computer readable medium storing the hydrocarbon potential indicator for display.

In another aspect the information handling system includes a processor configured. The predetermined frequency range may be in a range selected between 1 Hz and 10 Hz. Any processor may be configured to generate a map of the potential hydrocarbon indicator associated with a geographic location associated with the three component seismic data. Any processor may be configured determine the frequency spectrum from a plurality of time intervals. Any processor may be configured to apply a zero-phase band pass filter to the three-component seismic data. A display device may be included for displaying the hydrocarbon potential indicator.

While various embodiments have been shown and described, various modifications and substitutions may be made thereto without departing from the spirit and scope of the disclosure herein. Accordingly, it is to be understood that the present embodiments have been described by way of illustration and not limitation.

The invention claimed is:

1. A method of processing seismic data, comprising: a) acquiring three-component seismic data; b) combining horizontal components of the three-component seismic data to obtain a merged horizontal component; c) determining frequency spectra using a processing unit for the acquired three-component seismic data; d) determining a ratio of a vertical component of the seismic data to the merged horizontal component; e) determining an V/H integration-measure from the integration of the area bounded by a selected minimum-amplitude value and the amplitude values greater than the selected minimum-amplitude value; and f) storing the V/H integration-measure in a form for display.

2. The method of claim 1 wherein combining horizontal components of the three-component seismic data to obtain a merged horizontal component further comprises determining the square root of the sum of one-half of the squared horizontal component values.

3. The method of claim 1 wherein the selected minimum-amplitude value is 1.

4. The method of claim 1 further comprising determining the V/H integration-measure in a predetermined frequency range.

5. The method of claim 4 wherein the predetermined frequency range is a range selected between 1 Hz and 6 Hz.

6. The method of claim 1 wherein the seismic data is comprised of separate time intervals.

7. The method of claim 1 further comprising applying a band pass filter to the data.

8. The method of claim 1 further comprising forming a display of the V/H integration-measure.

9. A system for processing seismic data, comprising: a) means for acquiring three-component seismic data; b) means for combining horizontal components of the three-component seismic data to obtain a merged horizontal component; c) means for determining frequency spectra using a processing unit for the acquired three-component seismic data; d) means for determining a ratio of a vertical component of the seismic data to the merged horizontal component; e) means for determining an V/H integration-measure from the integration of the area bounded by a selected minimum-amplitude value and the amplitude values greater than the selected minimum-amplitude value; and f) means for storing the V/H integration-measure in a form for display.

10. The system of claim 9 wherein means for combining horizontal components of the three-component seismic data to obtain a merged horizontal component further comprises means for determining the square root of the sum of one-half of the squared horizontal component values.

11. The system of claim 9 wherein the selected minimum-amplitude value is 1.

12. The system of claim 9 further comprising means for determining the V/H integration-measure in a predetermined frequency range.

13. The system of claim 12 wherein the predetermined frequency range is a range selected between 1 Hz and 6 Hz.

14. The system of claim 9 further comprising means for applying a band pass filter to the data.

15. The system of claim 9 further comprising means for forming a display of the V/H integration-measure.

16. A set of computer program modules on a computer readable medium for execution on a processor in conjunction with an application program for determining an V/H integration-measure for displaying a hydrocarbon potential indicator determined from seismic data comprising: a first computer program module that receives data to determine a frequency spectrum for three component seismic data; a second computer program module that receives a selected minimum amplitude value; a third computer program module that receives a ratio of a vertical component of the seismic data to the merged horizontal component to obtain a V/H ratio; and a fourth computer program module that receives a V/H integration-measure from the integration of the V/H ratio for an area bounded by the selected minimum-amplitude value and the amplitude values greater than the selected minimum-amplitude value.

17. The set of computer program modules according to claim 16 further comprising: a fifth computer program module that receives instruction data for applying a zero-phase frequency filter to the seismic data.

18. The set of computer program modules according to claim 16 further comprising: a sixth computer program module that receives instruction data for determining the V/H integration measure within a predetermined frequency range.

19. The set of computer program modules according to claim 18 wherein the predetermined frequency range is a range selected between 1 Hz and 6 Hz.

20. The set of computer program modules according to claim 16 wherein the at least one program module is stored on a peer machine in a peer-to-peer network environment.

* * * * *